(No Model.)

M. P. ISBERG & E. H. BERGQUIST.
FLY TRAP.

No. 581,590.  Patented Apr. 27, 1897.

Witnesses:
L. C. Hills.
A. L. Hough.

Inventors
Magnus P. Isberg and
Emil H. Bergquist
Franklin H. Hough
Atty.

UNITED STATES PATENT OFFICE.

MAGNUS P. ISBERG AND EMIL H. BERGQUIST, OF SAN FRANCISCO, CALIFORNIA.

FLY-TRAP.

SPECIFICATION forming part of Letters Patent No. 581,590, dated April 27, 1897.

Application filed February 5, 1897. Serial No. 622,159. (No model.)

*To all whom it may concern:*

Be it known that we, MAGNUS P. ISBERG and EMIL H. BERGQUIST, citizens of the United States, residing at San Francisco, in the county of San Francisco and State of California, have invented certain new and useful Improvements in Fly-Traps; and we do hereby declare that the following is a full, clear, and exact description thereof.

This invention relates to certain new and useful improvements in fly-traps, and especially to the provision of a receptacle which is made preferably of glass and blown in such a shape that its lower portion is upwardly curved within the receptacle, forming a trough in which any suitable liquid may be held, in which it is designed to have the insects drop and drown, suitable means being provided to induce the insects to pass within the receptacle and, coming in contact with the inner curved wall of the trap, fall back into the liquid.

The invention relates more particularly to the provision in a trap of the nature described of a mirror, which is either placed in the upper portion of the trap on the inner wall thereof or preferably the coating of the trap about its upper surface with a material which will reflect from the under side, whereby flies or other insects which may be feeding below the trap may see their images in the reflecting portion above and, flying toward it, come forcibly against the inner wall of the glass and fall back into the liquid.

To these ends and to such others as the invention may pertain the same consists, further, in the novel construction which will be hereinafter described in detail and then specifically claimed.

We clearly illustrate our invention in the accompanying drawings, which, with the letters of reference marked thereon, form a part of this specification, and in which drawings—

Figure 1:
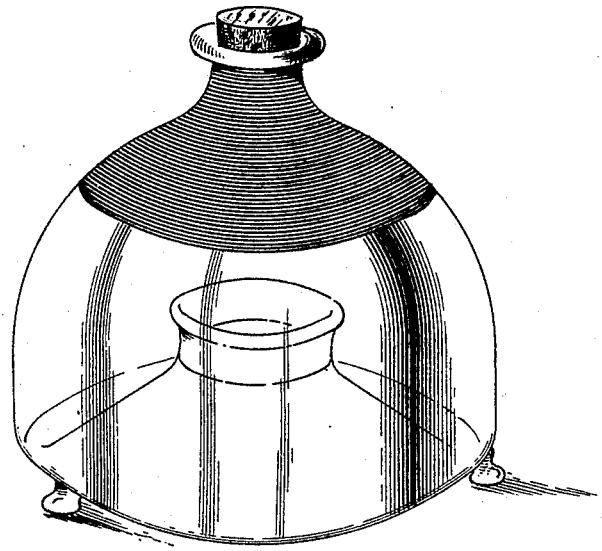
Figure 2:
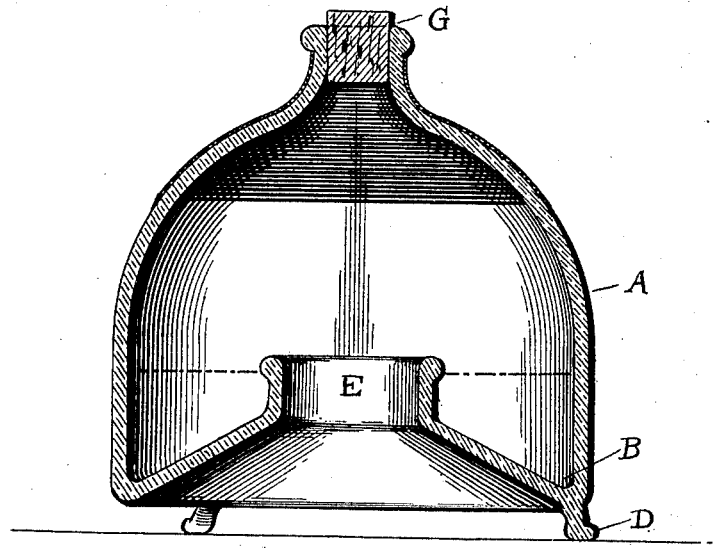

Figure 1 is a perspective view of the trap slightly tilted up. Fig. 2 is a vertical central sectional view through the trap.

Reference being now had to the details of the drawings by letter, A designates the receptacle of the trap, the lower portion of which is upwardly and forwardly turned, forming a trough B, adapted to hold the liquid, and suitable legs D are provided, so as to elevate the trap a slight distance to allow sufficient space beneath for the insects to pass under. The inturned bottom portion of the trap is apertured, as seen at E, and G is an aperture at the top, which may be closed by means of a cork or other suitable stopper.

Coated about the outer surface of the upper portion of the trap is the reflecting material forming the mirror, the reflecting-surface being toward the glass, whereby the insects which may pass under the trap may see their reflection in the mirror at the upper inner portion of the receptacle, and, flying toward the same, will contact against the surface of the glass which protects the mirror and fall back into the liquid in the trough beneath.

In operation the trough is first filled with water or other liquid and the trap set upon a table or other level surface, with suitable bait underneath the central aperture in the bottom, which will attract the insects, and when once under the trap will be allowed to pass up through the aperture in the lower portion against the mirror, as before described.

We are aware that it is common in the art to construct insect-traps substantially of the construction which we have hereinbefore described, as far as the shape of the trap is concerned, in which there is a trough adapted to hold water and to receive flies, and hence we make no claim for such construction.

Having thus described our invention, what we claim to be new, and desire to secure by Letters Patent, is—

A fly-trap of the construction described, having in combination therewith, about its upper surface, a mirror, with its reflecting-surface toward the glass, forming the trap, whereby flies may be attracted by their images in the said mirror, and coming against the surface of the mirror, fall back into the liquid-carrying trough, substantially as shown and described.

In testimony whereof we affix our signatures, in the presence of witnesses, this 22d day of January, 1897.

MAGNUS P. ISBERG.
EMIL H. BERGQUIST.

Witnesses:
N. A. ACKER,
ELMER WICKES.